United States Patent
Oh

(10) Patent No.: US 10,742,118 B2
(45) Date of Patent: Aug. 11, 2020

(54) QUASI-RESONANT POWER CONVERTER WITH REDUCED DYNAMIC SWITCHING LOSSES

(71) Applicant: Apple Inc., Cupertino, CA (US)

(72) Inventor: InHwan Oh, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/386,340

(22) Filed: Dec. 21, 2016

(65) Prior Publication Data

US 2018/0041116 A1    Feb. 8, 2018

Related U.S. Application Data

(60) Provisional application No. 62/370,603, filed on Aug. 3, 2016.

(51) Int. Cl.
*H02M 3/156* (2006.01)
*H02M 1/14* (2006.01)
*H02M 1/00* (2006.01)

(52) U.S. Cl.
CPC .......... *H02M 3/156* (2013.01); *H02M 1/14* (2013.01); *H02M 2001/0058* (2013.01); *Y02B 70/1425* (2013.01); *Y02B 70/1491* (2013.01)

(58) Field of Classification Search
CPC .......... H02M 3/156; H02M 1/14; H02M 7/06; H02M 1/08; H02M 2001/0048; H02M 2001/0058; Y02B 70/1491; Y02B 70/1425
USPC .......................................................... 363/84
See application file for complete search history.

(56) References Cited

U.S. PATENT DOCUMENTS

| | | | |
|---|---|---|---|
| 4,628,284 A * | 12/1986 | Bruning | H02M 3/3388 331/186 |
| 4,816,982 A | 3/1989 | Severinsky et al. | |
| 4,866,367 A * | 9/1989 | Ridley | H02M 3/1563 323/287 |
| 7,342,362 B2 | 3/2008 | Lin | |

(Continued)

FOREIGN PATENT DOCUMENTS

WO    WO 13/182844    12/2013

OTHER PUBLICATIONS

Received STIC search report from EIC 2800 searcher Samir Patel dated Jun. 15, 2017.*

(Continued)

*Primary Examiner* — Emily P Pham
*Assistant Examiner* — Htet Z Kyaw
(74) *Attorney, Agent, or Firm* — Brownstein Hyatt Farber Schreck, LLP

(57) ABSTRACT

A power converter includes a current-monitoring on-state controller that is configured to adjust the timing of a switch-mode voltage conversion stage of the power converter. For example, the timing of the turn-on of a MOSFET associated with a buck converter operated in a discontinuous conduction mode (e.g., quasi-resonant) can be adjusted based on a zero crossing of current through a tank inductor also associated with the buck converter. More particularly, the MOSFET may be turned on after a predetermined delay is initiated after current through the tank inductor reaches zero. The predetermined delay is based on a resonance period defined by the characteristic capacitance of the MOSFET and the inductance of the tank inductor.

20 Claims, 11 Drawing Sheets

(56) References Cited

U.S. PATENT DOCUMENTS

| | | | |
|---|---|---|---|
| 7,426,120 B2* | 9/2008 | Yang | H02M 3/33523 363/20 |
| 7,479,773 B2 | 1/2009 | Michishita | |
| 7,492,135 B2 | 2/2009 | Saeki | |
| 7,525,296 B2 | 4/2009 | Billig et al. | |
| 7,675,275 B2 | 3/2010 | Ruobiao et al. | |
| 7,911,813 B2 | 3/2011 | Yang et al. | |
| 8,587,964 B2* | 11/2013 | Yang | H02M 3/33507 363/21.02 |
| 8,629,651 B2 | 1/2014 | Guccione et al. | |
| 8,643,349 B2 | 2/2014 | Chen et al. | |
| 8,842,450 B2* | 9/2014 | Jungreis | H02M 3/285 363/21.03 |
| 9,019,729 B2 | 4/2015 | Kleinpenning | |
| 9,030,131 B2 | 5/2015 | Kado et al. | |
| 9,048,739 B2 | 6/2015 | Shoji et al. | |
| 9,124,184 B2 | 9/2015 | Sato et al. | |
| 9,166,481 B1 | 10/2015 | Vinciarelli et al. | |
| 9,231,411 B2 | 1/2016 | Baarman et al. | |
| 9,389,617 B2 | 7/2016 | Daily | |
| 9,444,357 B1* | 9/2016 | Matthews | G06F 1/3287 |
| 9,479,063 B2* | 10/2016 | Pan | H02M 1/44 |
| 9,543,833 B2 | 1/2017 | Shiu et al. | |
| 9,621,053 B1* | 4/2017 | Telefus | H02M 3/33507 |
| 9,722,497 B2* | 8/2017 | Fang | H02M 3/33507 |
| 9,825,485 B2 | 11/2017 | Lee et al. | |
| 9,876,365 B2 | 1/2018 | Mazaki et al. | |
| 10,040,358 B2 | 8/2018 | Elshaer et al. | |
| 10,103,578 B2 | 10/2018 | Yu et al. | |
| 10,116,279 B2 | 10/2018 | Ritter et al. | |
| 2003/0128555 A1* | 7/2003 | Schemmann | H02M 3/3385 363/16 |
| 2011/0032042 A1* | 2/2011 | Athas | H02M 3/07 331/117 FE |
| 2011/0096573 A1* | 4/2011 | Zhu | H02M 3/33523 363/21.17 |
| 2011/0157924 A1* | 6/2011 | Huynh | H02M 3/33507 363/21.15 |
| 2011/0261652 A1* | 10/2011 | Horsky | B06B 1/0253 367/97 |
| 2012/0299561 A1* | 11/2012 | Chen | H02M 3/33507 323/235 |
| 2013/0194845 A1* | 8/2013 | Bianco | H02M 1/4225 363/90 |
| 2014/0042821 A1 | 2/2014 | Boys et al. | |
| 2014/0055168 A1* | 2/2014 | Deng | H02M 1/00 327/108 |
| 2014/0078790 A1* | 3/2014 | Lin | H02M 3/33507 363/21.16 |
| 2014/0078798 A1* | 3/2014 | Turchi | H02M 1/4225 363/89 |
| 2014/0112027 A1* | 4/2014 | Tseng | H02M 3/33592 363/21.05 |
| 2014/0233275 A1* | 8/2014 | Yang | H02M 3/33576 363/21.17 |
| 2014/0292290 A1* | 10/2014 | Deng | H02M 1/00 323/235 |
| 2015/0062981 A1* | 3/2015 | Fang | H02M 3/33507 363/21.17 |
| 2016/0072393 A1 | 3/2016 | McIntyre | |
| 2016/0099660 A1* | 4/2016 | Khaligh | H02M 1/4241 363/126 |
| 2016/0118894 A1 | 4/2016 | Zhang et al. | |
| 2016/0128148 A1* | 5/2016 | Sasaki | H05B 33/0815 349/69 |
| 2016/0268899 A1 | 9/2016 | Rader et al. | |
| 2018/0004240 A1* | 1/2018 | Gritti | G05F 3/26 |
| 2018/0083490 A1 | 3/2018 | Oh et al. | |
| 2018/0091054 A1 | 3/2018 | Oh et al. | |

OTHER PUBLICATIONS

Received STIC search report from EIC 2800 searcher Mesfin Getaneh dated Aug. 30, 2018, Sep. 3, 2018, Sep. 4, 2018, for claims 1,15 and 18 respectively. (Year: 2018).*

Choi et al., "A Novel Bridgeless Single-Stage Half-Bridge AC/DC Converter," Virginia Polytechnic Institute and State University, Future Energy Electronics Center, Blacksburg, Virginia, 2010, 5 pages.

* cited by examiner

QUASI-RESONANT POWER CONVERTER WITH REDUCED DYNAMIC SWITCHING LOSSES

CROSS-REFERENCE TO RELATED APPLICATION

This application is a non-provisional patent application of, and claims the benefit to, U.S. Provisional Patent Application No. 62/370,603, filed Aug. 3, 2016, and titled "Quasi-Resonant Power Converter With Reduced Dynamic Switching Losses," the disclosure of which is hereby incorporated herein by reference in its entirety.

FIELD

Embodiments described herein generally relate to power converters and, in particular, to systems and methods for reducing switching losses in power converters.

BACKGROUND

An electronic device can receive electric power from a power source. The electronic device can include a power conversion and/or regulation circuit to change one or more characteristics of power received from the power source into a form usable by one or more components of the electronic device. In many examples, the power conversion and/or regulation circuit includes a power converter, such as a buck converter, boost converter, or a boost-buck converter.

A reduction in the physical size of a power converter incorporated within, or associated with, an electronic device is often desired. In these cases, power converters are conventionally implemented with smaller output capacitors and are conventionally operated at higher switching frequencies. However, as the operational frequency of a power converter is increased, dynamic switching losses accumulate more rapidly and operational efficiency of the power converter decreases.

SUMMARY

Embodiments described herein generally reference a power converter including a step-down voltage converter. The step-down voltage converter can include a tank inductor, an output capacitor in series with the tank inductor, a voltage-controlled switch in series with the tank inductor, and an on-state controller operably connected to the voltage-controlled switch. The on-state controller is coupled to a current monitor including an auxiliary coil magnetically coupled with the tank inductor. In this manner, when a voltage output from the current monitor crosses a predetermined threshold, a signal can be applied to the on-state controller after a predetermined delay (referred to herein as a "delayed signal"). The delayed signal turns the voltage-controlled switch on at a time that reduces switching losses.

Other embodiments described herein generally reference a power converter disposed within a housing of an electronic device. The power converter includes a resonant buck converter formed with a tank inductor connected in series with a MOSFET. In addition, the power converter includes a current monitoring circuit magnetically coupled with the tank inductor. The power converter also includes an on-state controller configured to increase a gate voltage of the MOSFET, after a predetermined delay, when a voltage output from the current monitoring circuit crosses a predetermined threshold. In other words, the current monitoring circuit is configured to detect the condition when current through the tank inductor reaches zero amps.

Still further embodiments described herein generally reference a method of reducing voltage in a power converter, the method including the operations of: receiving a voltage at an input of a buck converter defined by a tank inductor and a voltage-controlled switch and monitoring current through an auxiliary inductor isolated from the buck converter. Upon determining that current through the auxiliary inductor has dropped to zero amps, a predetermined delay is initiated, after which a switching voltage of the voltage-controlled switch is raised. In this manner, turn-on of the voltage-controlled switch is delayed until voltage across leads of the voltage-controlled switch when in the off-state is minimized (e.g., zero voltage switching). In these embodiments, the predetermined delay can be based on a resonance frequency associated with the tank inductor and a capacitance exhibited across the voltage-controlled switch when the voltage-controlled switch is not conducting.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
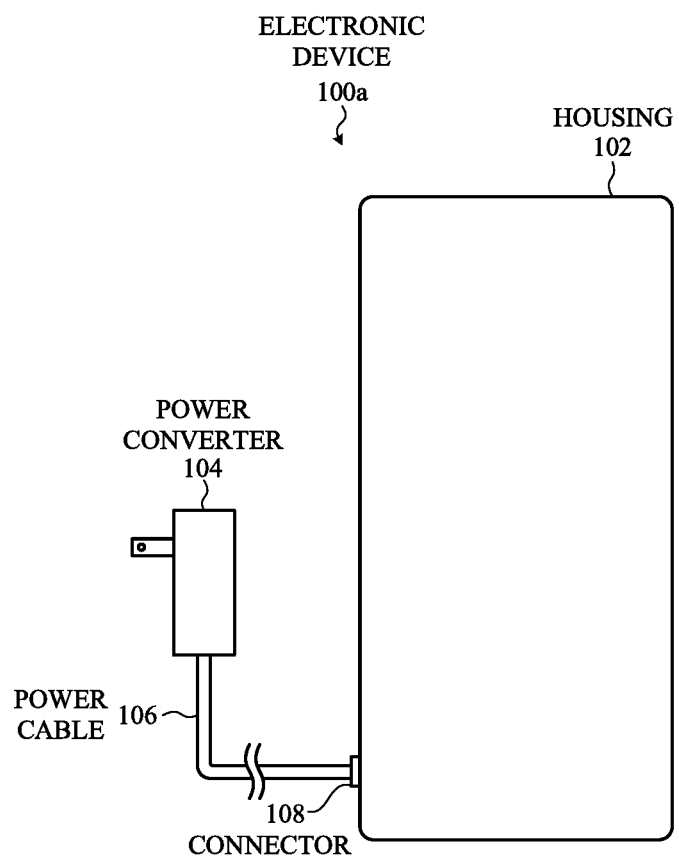
FIG. 1A depicts an electronic device coupled to a stand-alone power converter.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for operating a power converter in a manner that efficiently converts one or more characteristics of electric power received from an electric power source (more generally, "power source") into a form usable by one or more components of an electronic device. The electronic device may be any stationary or mobile electronic device such as a desktop computer, a laptop computer, a tablet computer, a cellular telephone, a peripheral device, an accessory device, a wearable device, a vehicle or aeronautical control system, an industrial control system, an appliance, and so on.

Generally, a power converter, such as described herein, is configured to convert voltage from an unregulated or otherwise noisy voltage source (herein, "input voltage") into a regulated voltage level (herein, "output voltage") suitable for use by one or more electronic devices. For example, a power converter can be configured to regulate mains voltage (e.g., 90 VAC-265 VAC at 50-60 Hz) to a reference level such as 3.3 VDC, 5.0 VDC, 12 VDC, 50 VDC or any other suitable reference voltage. In some examples, the output of the power converter can be boosted to a higher level after being regulated to the reference level.

For simplicity and consistency of the description provided herein, many embodiments are presented and described with reference to power converters configured to reduce a high voltage alternating current (e.g., 265 VAC) to a relatively lower voltage direct current (e.g., 50 VDC). It may be appreciated, however, that the various techniques, circuit topologies, operations and/or methods presented with respect to this particular implementation can be equivalently applied to power converters configured to regulate power in another manner. For example, a power converter such as described herein can be suitably configured in any implementation-specific manner to convert an arbitrary input voltage to any selected or desired output voltage, whether such operation requires DC-to-DC conversion stages, AC-to-DC conversion stages, DC-to-AC conversion stages, AC-to-AC conversion stages, or any combination or sequence thereof.

As noted above, some embodiments described herein reference a power converter configured to reduce an input voltage level to a particular output voltage level. In these examples, the power converter includes at least one step-down voltage converter, such as a buck converter, operated at a duty cycle selected to efficiently reduce the input voltage to the output voltage level. In many cases, the output of the step-down voltage converter is connected to a feedback circuit, such as a compensation network. The output of the step-down voltage converter can thereafter be connected to a load, such as an electronic device.

In some cases, a power converter may be constrained to a small size. As a result of reduced size, the step-down voltage converter may be required to operate at a higher frequency. However, high frequency operation of a step-down voltage converter conventionally results in increased dynamic switching losses and reduced power efficiency.

Accordingly, some embodiments described herein reference a power converter that incorporates a current-monitoring on-state controller (a "current monitor") configured to influence the turn-on timing of a step-down voltage converter that is configured to operate at high frequency. More specifically, the current-monitoring on-state controller includes an auxiliary inductor that is configured to measure current through one or more portions of the step-down voltage converter. Once current through the auxiliary inductor, and thus the monitored portion of the step-down voltage converter, crosses a threshold (e.g., 0.0 A for a step-down voltage converter operating in discontinuous-conduction mode), the current-monitoring on-state controller can trigger a turn-on of the step-down voltage converter.

In further embodiments, the current-monitoring on-state controller is coupled in series with a delayed trigger. In these embodiments, once current through the auxiliary inductor crosses a threshold, the current-monitoring on-state controller causes the delayed trigger to initiate a delay. The delay is typically based on a characteristic resonance frequency of one or more components of the step-down voltage converter. The delay can be a predetermined delay or can be dynamically changed. In this manner, the time at which the step-down voltage converter is turned on can be delayed until voltage across the voltage-controlled switch approaches or reaches a minimum value, such as zero volts. In this manner, dynamic switching losses (of the voltage-controlled switch) are minimized or eliminated and operational power efficiency of the power converter is increased.

These and other embodiments are discussed below with reference to FIGS. 1A-7. However, those skilled in the art will readily appreciate that the detailed description given herein with respect to these figures is for explanation only and should not be construed as limiting.

Figure 1B:
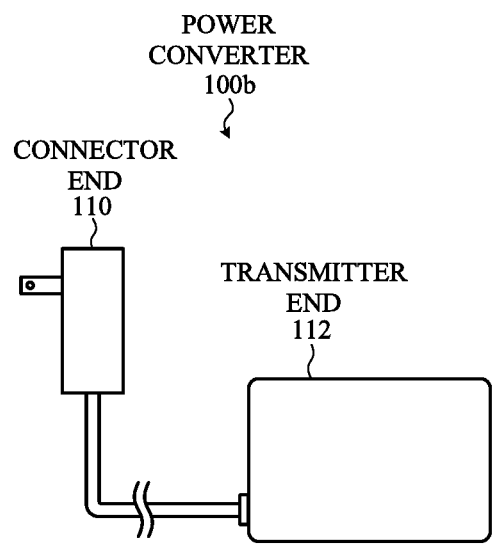
FIG. 1B depicts a stand-alone power converter configured for use with a wireless power transfer system.
Figure 1C:
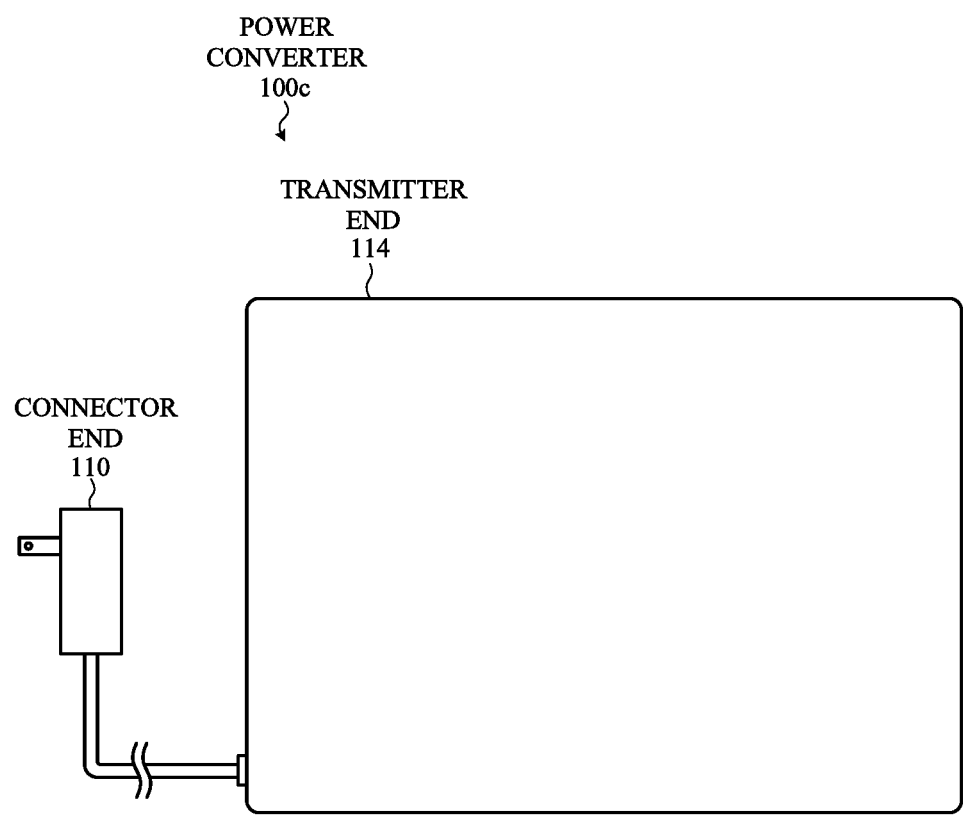
FIG. 1C depicts another stand-alone power converter configured for use with a wireless power transfer system.

Generally and broadly, FIGS. 1A-1C reference various example electronic devices that may incorporate, or may be associated with or coupled to, one or more power converters such as described herein. It will be appreciated, however, that the depicted examples are not exhaustive; the various embodiments described with reference to FIGS. 1A-1C may be modified or combined in any number of suitable or implementation-specific ways.

For example, FIG. 1A depicts an electronic device coupled to a stand-alone power converter configured to change one or more characteristics of power received from a power source into a form usable by the electronic device.

More particularly, the electronic device 100a includes a housing 102 to retain, support, and/or enclose various components of the electronic device 100a such as a rechargeable battery (not shown). The electronic device 100a can also include a processor, memory, power converter and/or battery, network connections, sensors, input/output ports, acoustic elements, haptic elements, digital and/or analog circuits for performing and/or coordinating tasks of the electronic device 100a, and so on. For simplicity of illustration, the electronic device 100a is depicted in FIG. 1A without many of these elements, each of which may be included, partially and/or entirely, within the housing 102 and may be operationally or functionally associated with the internal battery.

In one example, the internal battery of the electronic device 100a can be recharged by physically connecting the electronic device 100a to a power converter 104. More specifically, a power cable 106 can provide a direct electrical connection between the power converter 104 and the electronic device 100a. In some cases, the power cable 106 is connected to the electronic device 100a via a connector 108.

In these embodiments, the power converter 104 can be configured to accept power at mains voltage and output that power in a form usable by one or more circuits configured to facilitate recharging of the internal battery. In one particular example, the power converter 104 accepts 120 VAC as input and outputs 5 VDC, which can be accepted by the electronic device 100a and used to recharge the internal battery. More broadly, the power converter 104 can be configured to accept high-voltage AC and can be configured to output a lower-voltage DC.

In another example, the power converter 104 can be configured to accept power at mains voltage and output that power in a form that is subsequently converted again by the electronic device 100a prior to being used to charge the internal battery. More specifically, in this example, the power converter 104 can be configured to accept 120 VAC as input and can be configured to output 50 VDC. In these examples, the power converter 104 may also include an inverter (not shown). Thereafter, the electronic device 100a can accept 50 VDC and further convert, by a second power converter within the electronic device 100a, to 5 VDC.

More broadly, the power converter 104 can be configured in this example to accept high-voltage AC and can be configured to output lower-voltage DC. In addition, the second power converter (which can be enclosed within the housing 102) can be configured to accept relatively high-voltage DC and can be configured to output low-voltage DC.

It may be appreciated that the limited examples provided above are not exhaustive. For example, the power converter 104 may be configured to perform an AC-to-AC or AC-to-DC conversion to different voltages than those provided above. Similarly, a power converter enclosed within the housing of the electronic device 100a may be appropriately configured to provide AC-to-AC, AC-to-DC, DC-to-AC, or DC-to-DC conversion.

Furthermore, although illustrated as a cellular phone, it may be appreciated that the electronic device 100a can be another suitable electronic device that is either stationary or mobile, taking a larger or smaller form factor than illustrated. For example, in certain embodiments, the electronic device 100a can be a laptop computer, a tablet computer, a cellular phone, a wearable device, a health monitoring device, a home or building automation device, a home or building appliance, a craft or vehicle entertainment, control, power, and/or information system, a navigation device, and so on.

In still further embodiments, a power converter (such as the power converter 104) can be configured to operate with an inductive or resonant wireless power transfer system. For example, FIG. 1B depicts a stand-alone power converter, identified as the power converter 100b, configured to change one or more characteristics of power received from a power source into a form that may be wirelessly transferred to an electronic device (not shown). In this example, the power converter 100b can be configured to convert alternating current received via a connector end 110 into alternating current (at the same or different frequency) that can be used by a transmitter end 112 of the power converter 100b to generate one or more time-varying magnetic fields that can be used to wirelessly transfer power to an electronic device placed on or near the transmitter end 112. In this example, the power converter 100b can directly convert alternating current at one frequency and peak-to-peak voltage into altering current at a second frequency and peak-to-peak voltage. In this manner, the power converter 100b may operate more efficiently; an intermediate conversion to direct current is not required.

Another example of an inductive or resonant wireless power transfer system is depicted in FIG. 1C. More specifically, a power converter 100c can be configured to change one or more characteristics of power received from a power source into a form that may be wirelessly transferred to more than one electronic device is illustrated. As with the example described above, the power converter 100c can be configured to convert alternating current received via a connector end 110 into alternating current (at the same or different frequency) that can be used by a transmitter end 114 of the power converter 100c to generate one or more time-varying magnetic fields that can be used to wirelessly transfer power to multiple electronic devices each placed on or near the transmitter end 114. In this example, the power converter 100c directly converts alternating current at one frequency and peak-to-peak voltage into altering current at a second frequency and peak to peak voltage. In this manner, and as noted with respect to some embodiments described herein, the power converter 100c may operate more efficiently; an intermediate conversion to direct current is not required.

The foregoing embodiments depicted in FIGS. 1A-1C and the various alternatives thereof and variations thereto are presented, generally, for purposes of explanation, and to facilitate an understanding of various possible electronic devices or accessory devices that can incorporate, or be otherwise coupled to, one or more power converters such as described herein. More specifically, FIGS. 1A-1C are presented to illustrate that a power converter such as described herein can be incorporated, either entirely or partially, into the housing of an electronic device, into a separate power accessory that couples to an electronic device via a cable, into a separate power accessory that provides wireless power to one or more electronic devices, and so on.

Figure 2:
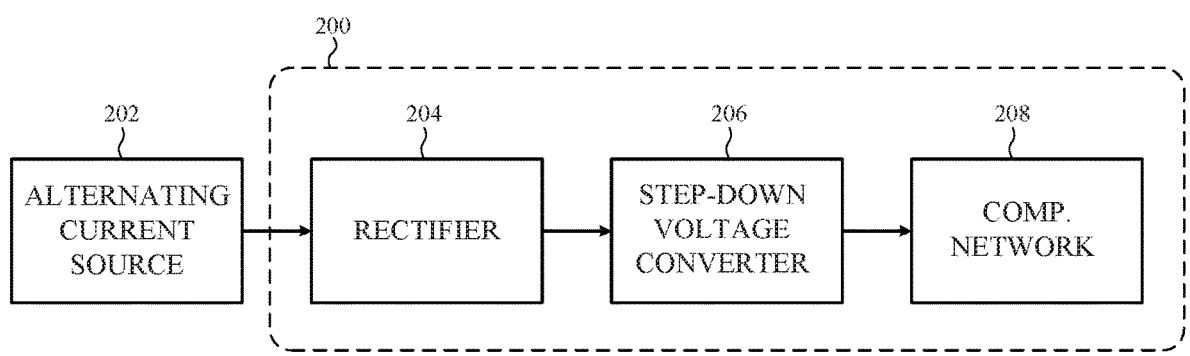
FIG. 2 is a simplified system diagram of a power converter that incorporates a step-down voltage converter such as described herein.
Figure 3:
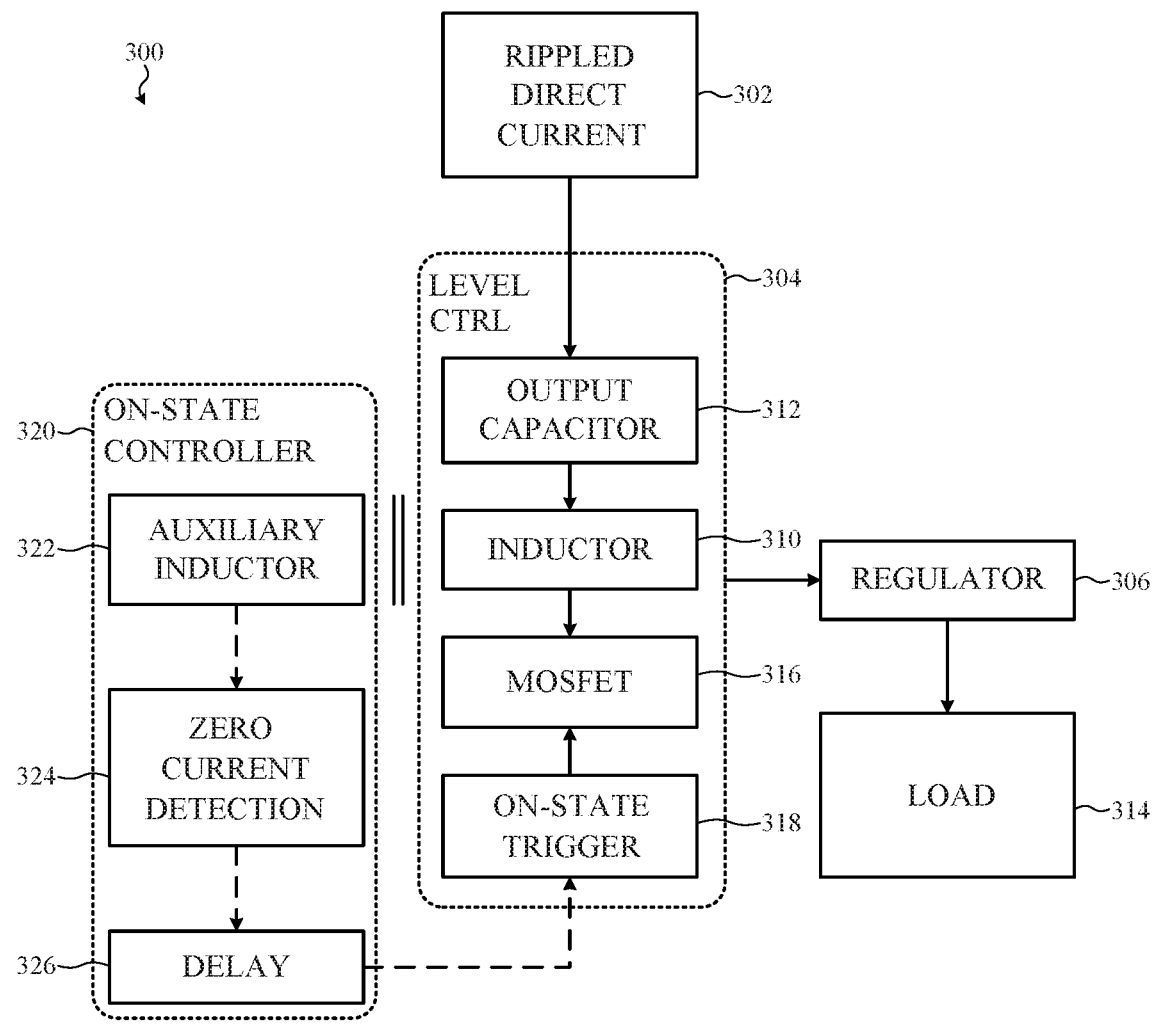
FIG. 3 is a simplified system diagram of a power converter that incorporates a step-down voltage converter and a current-monitoring on-state controller, such as described herein.

Generally and broadly, FIGS. 2-3 reference a power converter that may be incorporated within, coupled to or otherwise associated with, an electronic device such as the electronic devices depicted in FIGS. 1A-1C.

For example, FIG. 2 depicts a simplified system diagram of a power converter that incorporates a step-down voltage converter such as described herein. The power converter 200 can be configured to accept power from an alternating current power source 202.

The alternating current power source 202 can deliver alternating current with any suitable amplitude or frequency. In one example, the alternating current power source 202 is connected to the output of a step-up converter (not shown)

which can be configured to accept variable mains voltage as input (e.g., 110 VAC-265 VAC). In this case, the step-up converter may be configured to increase mains voltage to 400 VDC, or any other suitable voltage level that is reliably higher than the maximum expected mains voltage level (e.g., 265 VAC).

In other examples, the alternating current power source 202 can be implemented in another way. For example, the alternating current power source 202 can be a receive coil (or more than one receive coil) of a wireless power transfer system. More specifically, an inductive or resonant power transfer system can include a transmit coil and a receive coil that, when positioned in proximity of one another, form a primary coil and secondary coil of an air-gap transformer. When power transfers from the primary coil to the secondary coil, the secondary coil outputs alternating current.

However, for simplicity of illustration and description, the embodiments that follow are described in reference to an alternating current power source 202 configured to output high voltage alternating current, such as 90 VAC or 265 VAC, although as noted with respect to some embodiments described herein (e.g., wireless power transfer embodiments), any suitable alternating current power source can be stepped down or otherwise adjusted using the techniques, methods, and circuit topologies described below.

The power converter 200 can include multiple distinct and interconnected circuits or blocks, such as, but not limited to: a rectifier 204, a step-down voltage converter 206, and a compensation network 208. In some cases, the power converter 200 can also include or be associated with one or more of a processor, memory, sensors, digital and/or analog circuits for performing and/or coordinating tasks of the power converter 200. For simplicity of illustration and description, the power converter 200 is depicted in FIG. 2 without many of these elements.

The rectifier 204 of the power converter 200 receives alternating current from the alternating current power source 202 and rectifies the received current into a rippled direct current. The rectifier 204 can be a half-bridge rectifier, although in many embodiments a full-bridge rectifier is used. In many cases, a filter can be added in parallel to the output of the rectifier to further smooth the rippled direct current waveform. The filter can be any suitable low-pass filter (e.g., a capacitor or capacitor network parallel to the output of the rectifier or an inductor-capacitor choke or filter). The rectifier 204 can be implemented in any number of suitable ways. For example, the rectifier 204 can be a synchronous or asynchronous rectifier. For embodiments in which the alternating current power source 202 outputs ~265 VAC, the rectifier 204 outputs rippled direct current having an average bias of (up to) 400 VDC.

The step-down voltage converter 206 of the power converter 200 receives the rippled direct current from the rectifier 204. In many embodiments, the step-down voltage converter 206 is implemented with a buck converter topology.

In one example, a buck converter can include a tank inductor and an output capacitor. A low-side lead of the tank inductor is coupled to a high-side lead of the output capacitor, which, in turn, is connected in parallel to an output ground lead of the buck converter. The output leads of the buck converter are typically connected to a load. In many cases, a compensation network or other regulator is positioned between the output leads of the buck converter and the input leads of the load. The compensation network can provide regulation and ripple smoothing to the voltage received by the load. For simplicity of illustration, these components are not shown in FIG. 2.

A return diode couples a low-side lead of the output capacitor of the buck converter to a high-side lead of the tank inductor. The buck converter also includes a voltage-controlled switch that couples the high-side lead of the tank inductor to an input lead of the buck converter. The input lead of the buck converter receives the input voltage, which in the illustrated example is the rippled direct current output from the rectifier 204.

The buck converter can be switched between an on-state and an off-state by toggling the voltage-controlled switch. The buck converter topology described above is referred herein as a "high-side" buck converter as a consequence of the direct connection between the voltage-controlled switch and the input voltage received from the rectifier 204.

When a high-side buck converter is in the on-state, the voltage-controlled switch is closed and a first current loop is defined from the input voltage source, through the tank inductor, to the load. In this state, voltage across the tank inductor sharply increases to a voltage level equal to the difference between the voltage across the load and the input voltage. This voltage across the tank inductor induces current through the tank inductor to linearly increase. As a result of the topology of the circuit, the current flowing through the tank inductor also flows to the output capacitor and to the load.

Alternatively, when the high-side buck converter transitions to the off-state, the voltage-controlled switch is opened and a second current loop is defined through the return diode. In this state, voltage across the tank inductor sharply decreases to a voltage level equal to the difference between the voltage across the output leads of the buck converter and the cut-in voltage of the return diode. This voltage across the tank inductor is lower than when in the on-state, so current within the tank inductor linearly decreases in magnitude. The decreasing current flowing through the tank inductor also flows to the output capacitor and to the load connected across the output leads of the buck converter. In this manner, the output capacitor functions as a low-pass filter, generally reducing ripple in the voltage delivered from the output of the buck converter to the load.

The buck converter can be efficiently operated by switching between the on-state and the off-state by toggling the voltage-controlled switch at a duty cycle selected based on the desired output voltage. The voltage output from the buck converter is proportionately related to the input voltage by the duty cycle. This relationship can be modeled by Equation 1:

$$D_{cycle} = \frac{V_{out}}{V_{in}} \quad \text{Equation 1}$$

In one example, if direct current output from the rectifier 204 is 400 VDC and the desired output voltage is 50 VDC, a duty cycle of 12.5% may be selected.

In many cases, the buck converter is operated in a discontinuous conduction mode, although this may not be required. More particularly, if the buck converter is operated in a discontinuous conduction mode, current through the tank inductor regularly reaches 0.0 A. In some embodiments, the buck converter can be operated at or near resonance frequency of the tank inductor and the output capacitor.

In still further embodiments, the step-down voltage converter 206 can be implemented in another manner; it is appreciated that the example topology described above is merely one example of a suitable or appropriate step-down voltage converter.

For example, in another embodiment, the high-side lead of the tank inductor is coupled to a low-side lead of the output capacitor, which, in turn, is connected in parallel to the load. The return diode couples a low-side lead of the tank inductor to a high-side lead of the output capacitor. The voltage-controlled switch couples the low-side lead of the tank inductor to a ground reference of the buck converter. This topology is referred to herein as a "low-side" buck converter as a consequence of the connection between the voltage-controlled switch and the input voltage ground reference. In some cases, a step-down voltage converter 206 may be implemented with a low-side buck converter in order to have the same ground reference between the rippled direct current ground (connected to the load) and the output ground of the step-down voltage converter 206.

In many examples, the output of the step-down voltage converter 206 of the power converter 200 is rippled direct current having a voltage defined by the duty cycle at which the step-down voltage converter 206 is operated. In many cases, rippled direct current may not be preferred. As such, the compensation network 208 (or other voltage regulator) may be positioned between the output of the step-down voltage converter 206 and the load. The compensation network 208 can be configured to reduce ripple within the voltage output from the step-down voltage converter 206 and, additionally, provide feedback to a shunt voltage regulator coupled to the step-down voltage converter 206 so that the duty cycle of the step-down voltage converter 206 can be adjusted in real-time.

As noted with respect to some embodiments described herein, it may be required to operate the step-down voltage converter 206 at a high frequency. In this case, the power converter 200 incorporates a current-monitoring on-state controller (not shown) that is configured to adjust the turn-on timing of the step-down voltage converter 206. More specifically, the current-monitoring on-state controller typically includes an auxiliary inductor (see, e.g., FIG. 3) that is configured to measure current through the tank inductor of the step-down voltage converter 206. More particularly, the auxiliary inductor is positioned so as to be magnetically coupled to the tank inductor. Once current through the auxiliary inductor, and thus the tank inductor, reaches zero amps a resonance may be caused between the tank inductor and a stray capacitance across a voltage-controlled switch within the step-down voltage converter 206. The current-monitoring on-state controller can trigger a turn-on of the voltage-controlled switch when voltage across the voltage-controlled switch is at a minimum (e.g., at or near zero volts). In this manner, the current-monitoring on-state controller facilitates quasi-resonant operation of the step-down voltage converter 206.

In many cases, the current-monitoring on-state controller incorporates or is coupled to a delayed trigger (see, e.g., FIG. 3). In these embodiments, once current through the auxiliary inductor crosses a threshold, the current-monitoring on-state controller causes the delayed trigger to initiate a delay. The delay is typically based on a characteristic resonance frequency of the inductor and the characteristic capacitance of the voltage-controlled switch when the switch is open. In this manner, the time at which the step-down voltage converter 206 is turned on can be delayed until voltages associated with those components in resonance are at a minimum value (see, e.g., FIGS. 3, 6A-6C). In this manner, dynamic switching losses are minimized and/or eliminated, and operational power efficiency of the power converter 200 is increased.

FIG. 3 depicts a simplified system diagram of another example power converter, identified as the power converter 300. The power converter 300 can include multiple distinct and interconnected circuits or blocks, such as, but not limited to: a voltage level converter 304, a compensation network or regulator (identified as the regulator 306), and a current-monitoring on-state controller 320. As with some embodiments described herein, the power converter 300 can also include or be associated with one or more of a processor, memory, sensors, and digital and/or analog circuits for performing and/or coordinating tasks of the power converter 300. For simplicity of illustration and description, the power converter 300 is depicted in FIG. 3 without many of these elements.

The voltage level converter 304 of the power converter 300 receives the rippled direct current from a rippled direct current source 302. In many embodiments, the voltage level converter 304 is implemented with a low-side buck converter topology. For example, a low-side buck converter includes a tank inductor 310 and an output capacitor 312. In this topology, the high-side lead of the tank inductor 310 is coupled to a low-side lead of the output capacitor 312, which, in turn, is connected to the load 314 via the regulator 306.

A return diode (not shown) couples a low-side lead of the tank inductor 310 to a high-side lead of the output capacitor 312. The return diode defines a second current path through the tank inductor 310 to the load 314 when the buck converter is in an off-state. A MOSFET 316 can be used to couple the low-side lead of the tank inductor 310 to a ground reference of the buck converter.

The voltage level converter 304, implemented as a low-side buck converter, can be switched between an on-state and an off-state by toggling the MOSFET 316. More specifically, when the low-side buck converter is in the on-state, the MOSFET 316 is closed and a first current loop is defined from the rippled direct current source 302, through the tank inductor 310, to the load 314. In this state, voltage across the tank inductor 310 sharply increases to a voltage level equal to the difference between the voltage across the load 314 and the input voltage. This voltage across the tank inductor 310 induces current through the tank inductor 310 to linearly increase. As a result of the topology of the circuit, the current flowing through the tank inductor 310 also flows to the output capacitor 312 and to the load 314.

Alternatively, when the low-side buck converter transitions to the off-state, the MOSFET 316 is opened and a second current loop is defined through the return diode. In this state, voltage across the tank inductor 310 sharply decreases to a voltage level equal to the difference between the voltage across the load 314 and the cut-in voltage of the return diode. This voltage across the tank inductor 310 is lower than when in the on-state, so current within the tank inductor 310 linearly decreases in magnitude. The decreasing current flowing through the tank inductor 310 also flows to the output capacitor 312 and to the load 314 connected across the output leads of the buck converter. In this manner, the output capacitor 312 functions as a low-pass filter, generally reducing ripple in the voltage delivered from the output of the buck converter to the load 314. The regulator 306 further reduces remaining ripple in the voltage signal.

As noted with respect to some embodiments described herein, the buck converter can be efficiently operated by switching between the on-state and the off-state by toggling the MOSFET 316 at a duty cycle selected based on the desired output voltage. The MOSFET 316 can be controlled by an on-state trigger 318. The on-state trigger 318 is configured to selectively apply a voltage to the gate of the MOSFET 316 to enable the on-state of the buck converter.

As noted with respect to some embodiments described herein, it may be required to operate the voltage level converter 304 at a high frequency. In this case, the power converter 300 incorporates a current-monitoring on-state controller 320 that is configured to adjust the turn-on timing of the voltage level converter 304 by controlling a time at which the on-state trigger 318 is enabled. More specifically, the current-monitoring on-state controller 320 typically includes an auxiliary inductor 322 that is positioned adjacent to the tank inductor 310. In this manner, current through the auxiliary inductor 322 is equal to current through the tank inductor 310. As noted above, once current through the auxiliary inductor 322, and thus the tank inductor 310 reaches zero amps, a resonance between the tank inductor 310 and a capacitance exhibited by the MOSFET 316 (in a non-conducting state) can be caused. To mitigate switching losses during this resonance, the current-monitoring on-state controller 320 can trigger a turn-on of the voltage level converter 304 by waiting (e.g., triggering a predetermined delay after which the gate voltage of the MOSFET 316 may be raised) until the drain-source voltage of the MOSFET 316 becomes zero or near-zero. In this manner, the current-monitoring on-state controller 320 facilitates quasi-resonant operation of the voltage level converter 304.

More specifically, the current-monitoring on-state controller 320 can include a voltage divider 324 that is appropriately coupled in parallel or series with the auxiliary inductor 322. In this manner, as current is induced through the auxiliary inductor 322 by the tank inductor 310, voltage across the voltage divider 324 can change. More specifically, voltage across a resistor of the voltage divider 324 can be changed. As a result of the clamping, the voltage as measured from a measurement node of the voltage divider 324 can increase as current through the auxiliary inductor 322 decreases. This voltage signal can be used to control the on-state timing of the MOSFET 316. In this manner, generally and broadly, the current-monitoring on-state controller 320 can be used to facilitate zero-current and/or zero-voltage switching of the MOSFET 316 which, in turn, can reduce dynamic switching losses.

In further cases, the current-monitoring on-state controller 320 can also (optionally) incorporate a delay block 326 (e.g., a circuit configured to provide a signal, after a predetermined delay, in response to an input signal). The delay block 326 can be inserted between the output of the voltage divider 324 and the on-state trigger 318. The duration provided by the delay block 326 can be typically based on a characteristic resonance frequency of the tank inductor 310 and the characteristic capacitance of the MOSFET 316, when open. In this manner, the time at which the voltage level converter 304 is turned on can be delayed until voltages associated with those components in resonance are at a minimum value (see, e.g., FIGS. 6A-6C). In this manner, dynamic switching losses are further minimized and/or eliminated, and operational power efficiency of the power converter 300 is increased.

The foregoing embodiments depicted in FIGS. 2-3 and the various alternatives thereof and variations thereto are presented, generally, for purposes of explanation, and to facilitate a thorough understanding of various possible configurations and circuit topologies of a power converter that incorporates a current-monitoring on-state controller that facilitates efficient quasi-resonant operation. However, it will be apparent to one skilled in the art that some of the specific details presented herein may not be required in order to practice a particular described embodiment, or an equivalent thereof.

Figure 4A:
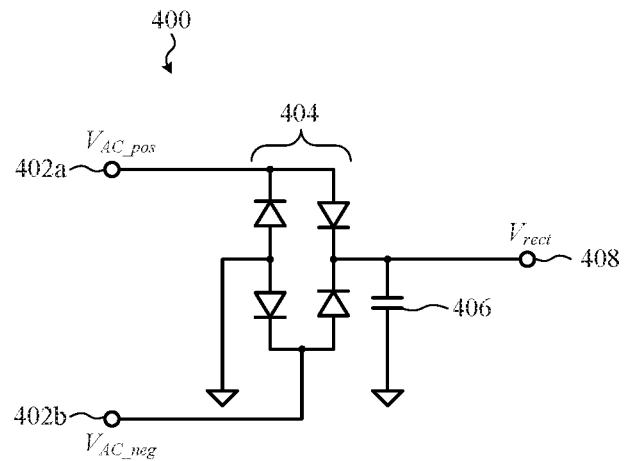
FIG. 4A is a simplified schematic diagram of a rectifier of a power converter, such as described herein.
Figure 4B:
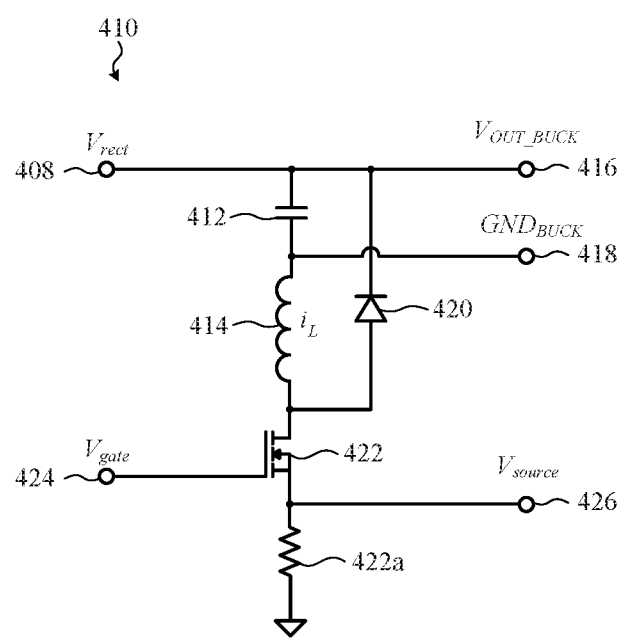
FIG. 4B is a simplified schematic diagram of a buck converter of a power converter, such as described herein.
Figure 4C:
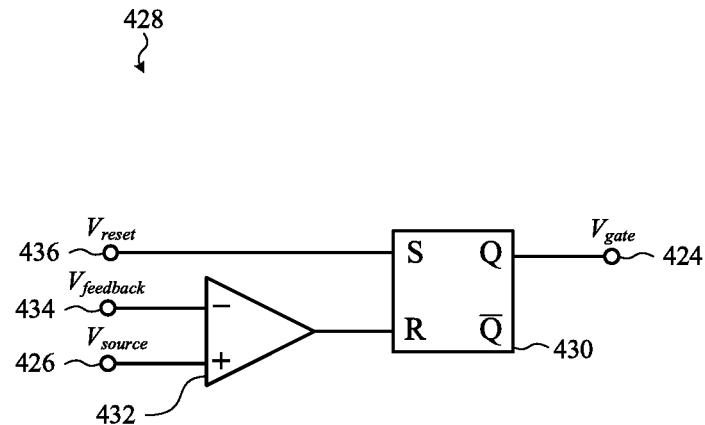
FIG. 4C is a simplified schematic diagram of a feedback controller of a power converter, such as described herein.
Figure 4D:
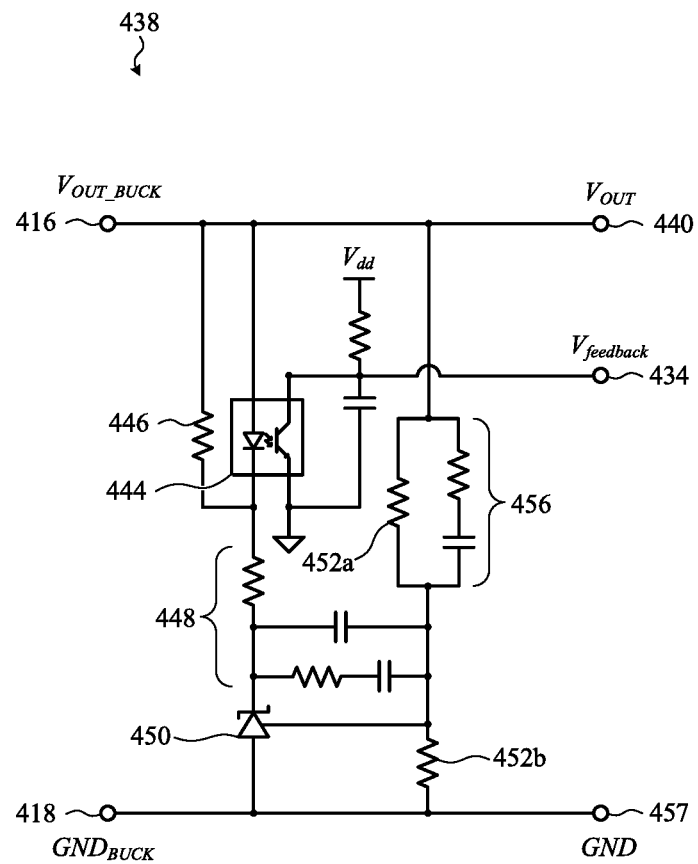
FIG. 4D is a simplified schematic diagram of a low-pass filter network of a power converter, such as described herein.
Figure 4E:
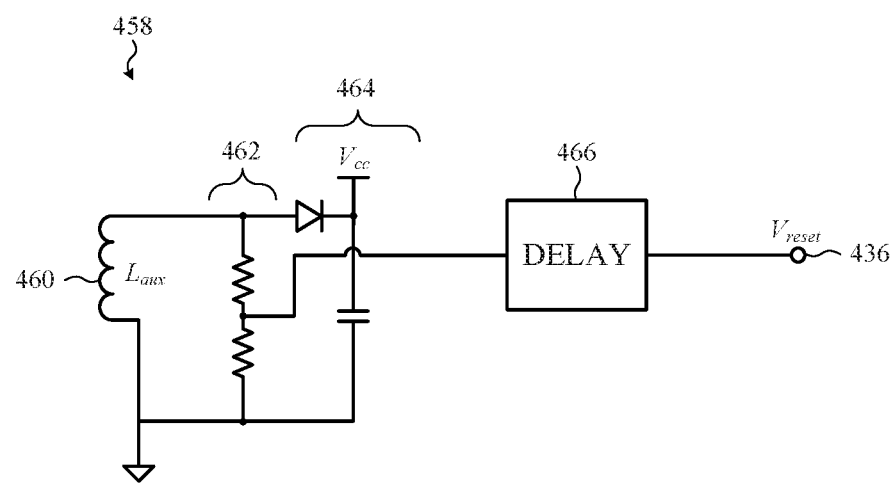
FIG. 4E is a simplified schematic diagram of a current-monitoring on-state controller of a power converter, such as described herein.
Figure 5:
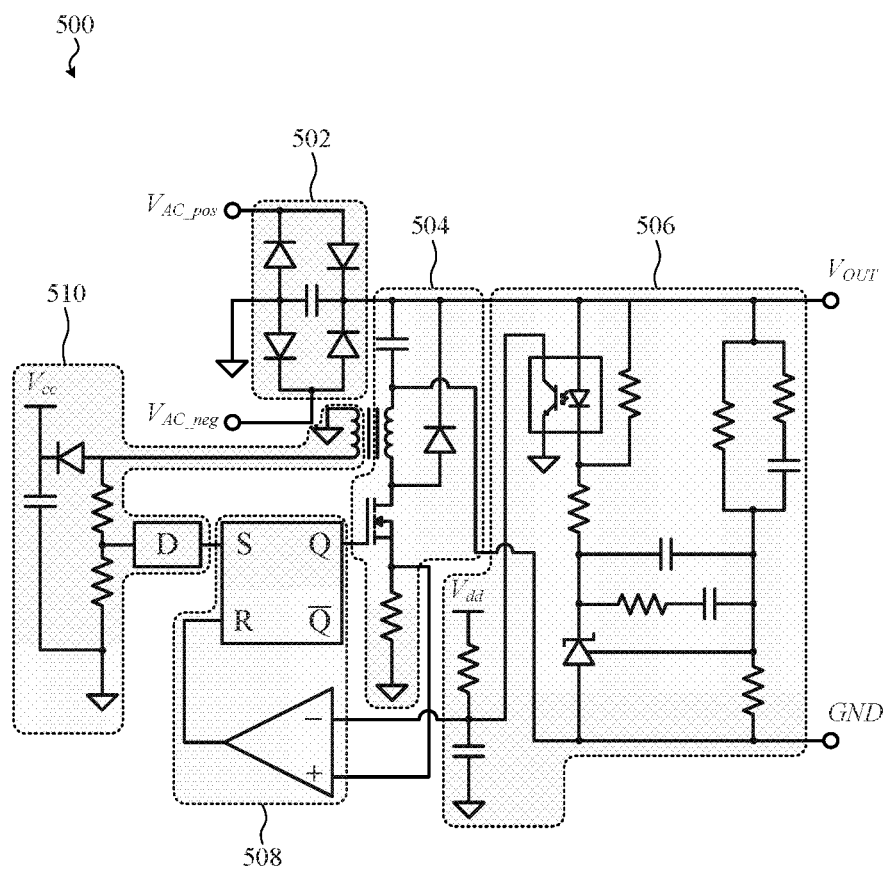
FIG. 5 is a simplified schematic diagram of a power converter incorporating a current-monitoring on-state controller, such as described herein.

Generally and broadly, FIGS. 4A-5 reference certain distinct and interconnected purpose-configured circuits that can be used to implement a power converter such as described herein. It will be appreciated, however, that the depicted examples are not exhaustive; the various embodiments depicted and described with reference to FIGS. 4A-5 may be implemented, interconnected, or otherwise modified in any number of suitable or appropriate ways.

For example, FIG. 4A depicts a simplified schematic diagram of an example rectifier of a power converter such as described herein. The rectifier 400 receives alternating current from an alternating current power source, (such as the alternating current power source 202 shown in FIG. 2) and rectifies the received current into a rippled direct current. More particularly, the rectifier 400 can be coupled to a two leads of an alternating current power source, identified as nodes $V_{AC\_pos}$ and $V_{AC\_neg}$ which are respectively associated with the rectifier input lead 402a and the rectifier input lead 402b.

The rectifier 400 can be a half-bridge rectifier, although in the illustrated embodiment a full-bridge rectifier formed by the diode network 404 is used. In many cases, a filter capacitor 406 can be added in parallel to the output $V_{rect}$ of the rectifier 400 to further smooth the rippled direct current waveform. The filter capacitor 406 functions as a low-pass filter. Although the rectifier is illustrated as a passive full-wave rectifier, such a configuration may not be required of all embodiments. For example, the rectifier 400 can be a synchronous rectifier in which the diodes of the diode network 404 are substituted for switches such as MOSFETs. The output terminal of the rectifier 400, which is configured to output rippled direct current (e.g., rectified alternating current), is identified as the rectifier output terminal 408.

FIG. 4B depicts a simplified schematic diagram of a high-side buck converter of a power converter such as described herein. As with other buck converters described herein, the high-side buck converter 410 includes an output capacitor 412 and a tank inductor 414. In this topology, the high-side lead of the tank inductor 414 is coupled to a low-side lead of the output capacitor 412, which, in turn, is connected to output leads of the high-side buck converter 410. Specifically, output leads of the high-side buck converter 410 include a positive output terminal 416 and a negative output terminal 418.

A return diode 420 couples a low-side lead of the tank inductor 414 to a high-side lead of the output capacitor 412. The return diode 420 defines a second current path through the tank inductor 414 to the positive output terminal 416 when the high-side buck converter 410 is in an off-state. A MOSFET 422 can be used to couple the low-side lead of the tank inductor 414 to a ground reference of the high-side buck converter 410.

The voltage level converter, implemented as a high-side buck converter 410, can be switched between an on-state and an off-state by toggling the MOSFET 422. More specifically, when the high-side buck converter 410 is in the on-state, the MOSFET 422 is closed and a first current loop is defined from the rectifier output terminal 408, through the tank inductor 414, to the positive output terminal 416.

In the on-state, voltage across the tank inductor 414 sharply increases to a voltage level equal to the difference between the voltage across the output capacitor 412 and the input voltage $V_{rect}$. This voltage across the tank inductor 414 induces current $i_L$ through the tank inductor 414 to linearly increase. As a result of the topology of the circuit, the current $i_L$ flowing through the tank inductor 414 also flows to the output capacitor 412 and to the positive output terminal 416.

When the high-side buck converter 410 transitions to the off-state, the MOSFET 422 is opened and a second current loop is defined through the return diode 420. In this state, voltage across the tank inductor 414 sharply decreases to a voltage level equal to the difference between the voltage across the output capacitor 412 and the cut-in voltage of the return diode 420 (e.g., 0.7 VDC). This voltage across the tank inductor 414 is lower than when in the on-state, so the current $i_L$ within the tank inductor 414 linearly decreases in magnitude. The decreasing current $i_L$ flowing through the tank inductor 414 also flows to the output capacitor 412 and to the positive output terminal 416 connected across the output leads of the high-side buck converter 410. In this manner, the output capacitor 412 functions as a low-pass filter, generally reducing ripple in the voltage delivered from the output of the high-side buck converter 410 to the positive output terminal 416.

More particularly, as noted with respect to some embodiments described herein, the high-side buck converter 410 can be efficiently operated by switching between the on-state and the off-state by toggling the gate voltage $V_{gate}$ of the MOSFET 422 at a duty cycle selected based on the desired output voltage. More specifically, increasing the voltage at the gate 424 of the MOSFET 422 can cause the MOSFET 422 to conduct current. In many embodiments, a voltage at the source 426 of the MOSFET 422, $V_{source}$ can be used as input to a comparator discussed in reference to FIG. 4C, discussed below.

The high-side buck converter 410 can be toggled from the on-state to the off-state in a manner that is responsive to changes in impedance of a load. More particularly, the high-side buck converter 410 can include a feedback controller 428, such as shown in FIG. 4C. The feedback controller 428 can include a flip-flop 430 that is reset via output from a comparator 432.

The comparator 432 receives negative input by probing an output of a compensation network at an isolated node 434 to determine a feedback voltage $V_{feedback}$ (see, e.g., FIG. 4D). The comparator 432 receives positive input by probing the voltage $V_{source}$ at the source 426 of the MOSFET 422 (see FIG. 4B) when the MOSFET 422. The comparator 432 compares the difference between the negative input $V_{feedback}$ and the positive input $V_{source}$ to produce an output.

When the MOSFET 422 is in the on-state and is conducting current, the resistor 422a is connected to the source of the MOSFET 422. As a result, voltage across the resistor 422a corresponds to current through the MOSFET 422. As the MOSFET 422 begins conducting current, voltage across the resistor 422a increases. This increase in voltage across the resistor 422a is fed to the positive input of the comparator 432 (see, e.g., FIG. 4C). The negative input of the comparator 432 is received from the voltage control loop, $V_{feedback}$. As noted above, the output of the comparator 432 is connected to the reset input of the flip-flop 430. As a result of the depicted configuration, the flip-flop 430 will be reset (e.g., the output of the comparator 432 will be high) when $V_{sense}$ is larger than $V_{feedback}$. When the flip-flop 430 is reset, the MOSFET 422 will be turned off. Thereafter, the voltage of the source of the MOSFET 422 will be zero volts and current through the resistor 422a will be zero amps (e.g., because the MOSFET 422 is not conducting current from drain to source). The set input of the flip-flop 430 is fed from a fixed clock frequency; after the MOSFET 422 turns off, the next few switching cycles will be triggered by the fixed clock frequency.

In this manner, if the output voltage of the power converter drops, $V_{feedback}$ increases which, in turn, will increase the per-cycle on-time of the MOSFET 422 because the flip-flop 430 will retain the set condition until the voltage across the resistor 422a equals the higher feedback voltage. As may be appreciated, a higher voltage across the resistor 422a corresponds to a higher current through the MOSFET 422 (e.g., higher peak current) which increases the output voltage of the power converter. In this manner, the output voltage of the power converter can be regulated independent of the load current and independent of the input voltage. The flip-flop 430 also includes a set lead 436 which is discussed in further detail in reference to FIG. 4E.

The output of the high-side buck converter 410 can be coupled to a compensation network and/or a regulation network in order to regulate $V_{OUT\_BUCK}$ against any load variation. FIG. 4D depicts a simplified schematic diagram of one such network that includes, among other components, an output voltage feedback network with loop compensation to stabilize a dynamic response of the system in case of load variation.

The compensating network 438 can be formed in any number of suitable ways to provide stable operation of the voltage output from the high-side buck converter 410 and to provide an isolated node suitable for providing feedback to the comparator 432.

More particularly, the compensating network 438 as shown in the illustrated embodiment includes two input terminals, two output terminals, and the isolated node 434 for feedback to the comparator 432. The two input terminals are a negative output terminal 416 and a positive output terminal 418 of the high-side buck converter 410 (see, e.g., FIG. 4B). The two output terminals are identified as the positive output load terminal 440 and the output ground reference terminal 456.

The compensating network 438 can include an opto-coupler 444 that can be used to isolate (e.g., to support galvanic isolation) the isolated node 434 and to isolate a ground loop associated with the high-side buck converter 410 from a ground loop associated with the output of the power converter. A high side of the light-emitting portion of the opto-coupler 444 can be coupled to the input terminal of the compensating network 438, which has a potential equal to $V_{OUT\_BUCK}$. In this manner, changes in the value of $V_{OUT\_BUCK}$ (e.g., ripple), can result in changes in brightness of the opto-coupler 444, which in turn can change the voltage at the isolated node 434 used by the comparator 432 to control the duration of the on-state of the MOSFET 422.

It may be required to operate the high-side buck converter 410 at a high frequency. In this case, the power converter can incorporate a current-monitoring on-state controller that is configured to adjust the turn-on timing of the high-side buck converter 410 by controlling a time at which the on-state trigger is enabled. In some cases, a bias resistor 446 can be positioned parallel to the light-emitting portion of the opto-coupler 444 to provide bias current to the shunt regulator 450.

The compensating network 438 can also include a resistor-capacitor network 448 which can be suitably tuned and/or designed in order to provide stable feedback to the comparator 432 via the opto-coupler 444. Particularly, the resistor-capacitor network 448 can be coupled to a shunt voltage regulator 450 that provides a constant voltage reference based on a voltage divider defined by the of a resistor 452*a* and the resistor 452*b*.

The compensating network 438 can also include a resistor-capacitor network 457 to sense output voltage and/or current. In the illustrated example, the resistor-capacitor network 457 can operate to stabilize the $V_{OUT\_BUCK}$ signal. The resistor-capacitor network 457 is typically coupled in parallel with the resistor 452*a*.

As noted with respect to some embodiments described herein, it may be required to operate the high-side buck converter 410 at a high frequency. In this case, as shown in FIG. 4E, the power converter incorporates a current-monitoring on-state controller 458 that is configured to adjust the turn-on timing of the high-side buck converter 410 by controlling a time at which the flip-flop 430 is set. More specifically, the current-monitoring on-state controller 458 typically includes an auxiliary inductor 460 that is positioned adjacent to the tank inductor 414.

In this manner, the auxiliary inductor 460 is configured to directly detect zero or near-zero current through the tank inductor 414. In addition, the auxiliary inductor 460 is configured to indirectly detect the condition at which drain-source voltage of the MOSFET 422 is zero or near-zero. As noted above, once current through the auxiliary inductor 460, and thus the tank inductor 414, reaches zero amps, a resonance is caused between the MOSFET 422 and the tank inductor 414, which can lead to switching losses. Therefore, in these embodiments, the current-monitoring on-state controller 458 can trigger a turn-on of the MOSFET 422 by raising the voltage of the set lead 436 of the flip-flop 430 only after the resonance condition causes voltage across the MOSFET 422 to be zero or near-zero (e.g., one period of resonance, a half period of resonance, or any other suitable time). In this manner, the current-monitoring on-state controller 458 facilitates quasi-resonant operation of the high-side buck converter 410.

More specifically, the current-monitoring on-state controller 458 can include a voltage divider 462 that is appropriately coupled in parallel or series with the auxiliary inductor 460. In this manner, as current is induced through the auxiliary inductor 460 by the tank inductor 414, the auxiliary inductor 460 can be used to detect zero current through the tank inductor 414 by monitoring the voltage across the voltage divider 462.

As a result, the voltage as measured from a measurement node of the voltage divider 462 can be used to detect zero or near-zero current through the MOSFET 422 and zero or near-zero drain-source voltage across the MOSFET 422. As noted with respect to some embodiments described herein, this voltage signal can be used to control the on-state timing of the MOSFET 422. In this manner, generally and broadly, the current-monitoring on-state controller 458 can be used to facilitate zero-current and/or zero-voltage switching of the MOSFET 422 which, in turn, can reduce dynamic switching losses.

In further cases, the current-monitoring on-state controller 458 can also incorporate a delay block 466. In some embodiments, the delay block 466 is an inverter delay circuit. In other cases, the delay block 466 can be configured to provide a variable delay. One of ordinary skill in the art would recognize that various analog and digital circuits, or combinations thereof, can provide delayed output signal(s) responsive to input signal(s).

The delay block 466 is inserted between the output of the voltage divider 462 and the set lead 436 of the flip-flop 430. The duration provided by the delay block 466 can be typically based on a characteristic resonance frequency of the tank inductor 414 and the characteristic capacitance of the MOSFET 422, when open.

More specifically, when the MOSFET 422 is in the on-state and current is flowing through the tank inductor 414, voltage across the MOSFET 422 is effectively 0.0V (e.g., disregarding conduction losses). However, when the MOSFET 422 is in the off-state, a voltage between the drain and the source 426 exists; the MOSFET 422 exhibits a capacitance. In the off-state, as noted above, current $i_L$ through the tank inductor 414 drops linearly toward zero amps and the return diode 420 stops conducting. As a result, capacitance within the MOSFET 422 may resonate with the tank inductor 414, which can induce a current of opposite sign to flow through the tank inductor 414. If the MOSFET 422 were to be turned on when the voltage across the source 426 and the drain were greater than zero, switching losses would occur. Thus, the delay provided by the delay block 466 is selected so that the MOSFET 422 is turned on only after the voltage across the drain and source of the MOSFET 422 reaches a valley or minimum in the resonance period.

Figure 6A:
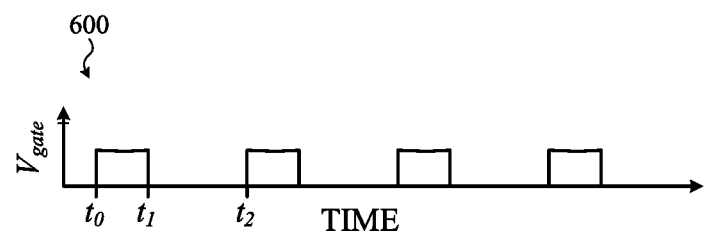
FIG. 6A is a simplified signal diagram tracking a voltage level that may be used to toggle an on-state of a buck converter of a power converter, such as described herein.
Figure 6B:
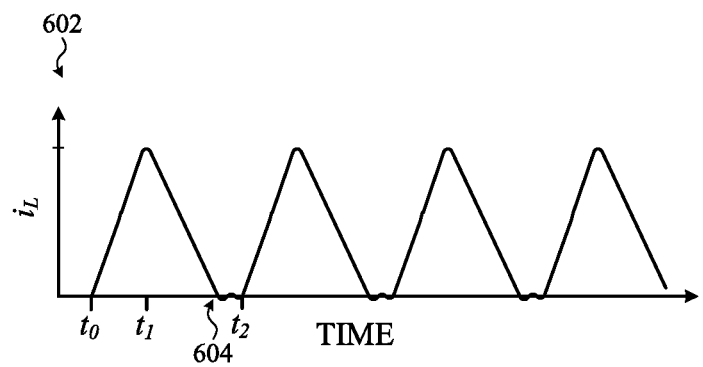
FIG. 6B is a simplified signal diagram tracking current through a tank inductor of the buck converter described in reference to FIG. 6A.
Figure 6C:
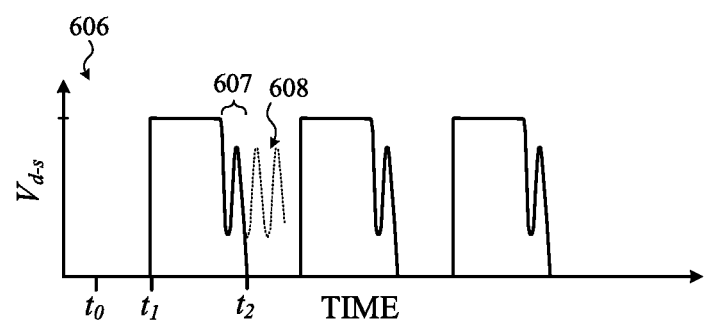
FIG. 6C is a simplified signal diagram tracking voltage across a switch of the buck converter described in reference to FIG. 6A.

In this manner, the time at which the high-side buck converter 410 is turned on can be delayed until voltages associated with those components in resonance are at a minimum value (see, e.g., FIGS. 6A-6C). In this manner, dynamic switching losses are further minimized and/or eliminated, and operational power efficiency of the power converter is increased.

FIG. 5 depicts a simplified schematic diagram of a power converter that may be implemented with the various schematics depicted and described in reference to FIGS. 4A-4E. In particular, the power converter 500 is configured to receive high-voltage AC and configured to output reduced voltage DC. Particularly, the power converter 500 includes a rectifier 502 that feeds into a high-side buck converter 504. The output of the high-side buck converter 504 can be regulated by a compensating/feedback network 506. Feedback received from the compensating/feedback network 506 can be supplied to a comparator 508. Finally, the power converter 500 can include a current-monitoring on-state controller 510 that assists in timing the turn-on of a MOSFET of the high-side buck converter 504 so that parasitic capacitances that develop and resonate within the power converter 500 during the off-state of the buck converter do not exacerbate switching losses.

The foregoing embodiments depicted in FIGS. 4A-5 and the various alternatives thereof and variations thereto are presented, generally, for purposes of explanation, and to facilitate a thorough understanding of various possible configurations of circuits that may be used to implement a power converter such as described herein. However, it will be apparent to one skilled in the art that some of the specific details presented herein may not be required in order to practice a particular described embodiment, or an equivalent thereof.

Generally and broadly, FIGS. 6A-6C are simplified signal diagrams corresponding to steady state operation of a power converter such as described herein.

For example, FIG. 6A depicts a simplified signal diagram tracking a voltage level that may be used to toggle an on-state of a buck converter (see, e.g., FIG. 4B) of a power converter such as described herein. In particular, the signal diagram 600 depicts a gate voltage that may be used to control the conduction of a voltage-controlled switch (e.g., MOSFET, IGBT, and so on), such as the MOSFET 422 shown in FIG. 4B. In the illustrated example, the gate voltage is toggled at a duty cycle approximately equal to 33%. More specifically, the gate voltage is on from time $t_0$ to time $t_1$ and off from time $t_1$ to time $t_2$; the associated voltage-controlled switch is in a conducting state from time $t_0$ to time $t_1$.

FIG. 6B depicts a simplified signal diagram 602 tracking current through a tank inductor (e.g., the tank inductor 414 as shown in FIG. 4B) of the buck converter described in reference to FIG. 6A. As noted with respect to some embodiments described herein, current through the tank inductor of a buck converter increases linearly if a constant voltage is applied across the voltage $$\left(\text{e.g., } \frac{dI}{dt} = \frac{V}{L}\right).$$

Thus, the current through the tank inductor increases as the time approaches $t_1$. At time $t_1$, the gate voltage of the voltage-controlled switch shifts to 0.0V; the voltage controlled switch stops conducting. At this time, voltage across the tank inductor reduces to a value equivalent to the output voltage of the buck converter less the cut-in voltage of a return diode. As described above, this change in voltage causes current through the tank inductor to linearly decrease. If the buck converter is operated in a discontinuous conduction mode, the current can approach and cross 0.0 A, identified in FIG. 6B as the zero crossing 604.

As noted with respect to some embodiments described herein, a power converter can include a current-monitoring on-state controller that includes an auxiliary inductor positioned nearby the tank inductor of a buck converter such that the auxiliary inductor and the tank inductor are magnetically coupled. As such, it may be appreciated that the current depicted in FIG. 6B can also equivalently represent the current through an auxiliary inductor of a current-monitoring on-state controller.

FIG. 6C depicts a simplified signal diagram 606 tracking voltage across the voltage-controlled switch of the buck converter described in reference to FIG. 6A. As noted with respect to some embodiments described herein, a potential difference exists across the voltage-controlled switch (e.g., the drain-source voltage of a MOSFET, such as the MOSFET 422 shown in FIG. 4B) when the voltage-controlled switch is not conducting. In the illustrated embodiment, the voltage-controlled switch stops conducting at time t.sub.1, after which a voltage is present across the voltage-controlled switch. Once current through the inductor (tank inductor or auxiliary inductor) drops to zero volts at the zero crossing 604, the voltage across the voltage-controlled switch can resonate with the tank inductor, as shown in FIG. 6C. The period of this resonance is based on the characteristic capacitance of the voltage-controlled switch and the inductance of the tank inductor. In this example, the voltage-controlled switch may be turned on again after a delay 607 that is based on the resonance period. In this manner, the voltage-controlled switch is turned on when the voltage across the voltage-controlled switch is at a minimum. This can prevent further resonance and power loss and/or switching losses, which are represented as the avoided losses 608. In this manner, dynamic switching losses are minimized and/or eliminated, and operational power efficiency of the power converter is increased. Additionally, one of skill in the art will appreciate that the delay 607 need not be based on a single period of resonance; in other embodiments the voltage-controlled switch can be turned off at a first valley of resonance (e.g., half a period of resonance), at a second valley of resonance (e.g., a full resonance period), at a third valley of resonance, and so on.

Figure 7:
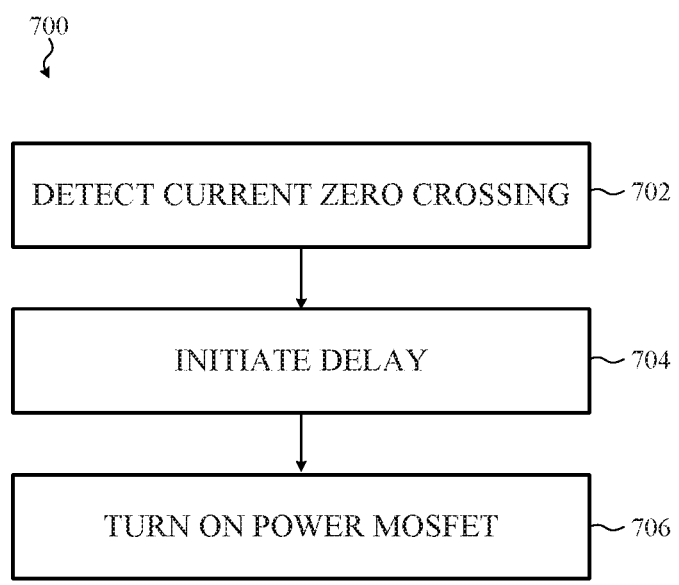
FIG. 7 is a simplified flow chart depicting example operations of a method of operating a current-monitoring on-state controller, such as described herein.

FIG. 7 is a simplified flow chart depicting example operations of a method of operating a current-monitoring on-state controller such as described herein. The method depicted can, in some embodiments, be performed (at least in part) by one or more portions of a power converter such as depicted in FIGS. 4A-5. In other cases, the method is performed by another processor or circuit, or combination of processors or circuits.

The method 700 begins at operation 702 in which a zero crossing of current is detected. In some cases, an auxiliary inductor can be positioned adjacent to a tank inductor of a buck converter. Current through the auxiliary inductor is equal to current through the tank inductor. In other cases, a different current can be measured. For example, current can be measured by an inductor or Hall effect sensor positioned around or adjacent a conductor, such as a lead or trace associated with a buck converter of a power converter. Accordingly, it may be appreciated that a zero crossing of current can be measured or obtained in any number of suitable ways.

Next, at operation 704, a delay is initiated. The delay can be based, at least in part, on a resonance frequency associated with the power converter. In one specific example, the resonance frequency is based on a characteristic capacitance of a MOSFET and the inductance of a tank inductor that are each associated with a buck converter. More specifically, the delay can be configured to approximate one period of the resonance frequency, thereby approximating a future time at which the drain-source voltage of the MOSFET is at a minimum. Lastly, at operation 706, the MOSFET can be enabled.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A power converter comprising:
a step-down voltage converter comprising:
  a tank inductor;
  an output capacitor in series with the tank inductor;
  a voltage-controlled switch in series with the tank inductor, the voltage-controlled switch operable in a conducting state and a non-conducting state; and
  an on-state controller operably connected to the voltage-controlled switch;
a current monitor comprising:
  an auxiliary coil magnetically coupled with the tank inductor; and a resistor in series with the auxiliary coil; and
a delay circuit configured to apply a signal to the on-state controller to trigger the conducting state of the voltage-controlled switch after a voltage output from the current monitor crosses a predetermined threshold; wherein
the signal is applied after a predetermined delay approximately equal to a multiple of a half period of a resonance frequency defined by an inductance of the tank inductor and a capacitance exhibited by the voltage-controlled switch when in the non-conducting state.

2. The power converter of claim 1, wherein the voltage-controlled switch comprises a MOSFET.

3. The power converter of claim 2, wherein the delay circuit is configured to initiate the predetermined delay once a voltage across the resistor drops below a threshold.

4. The power converter of claim 1, wherein the predetermined delay approximates one period of the resonance frequency.

5. The power converter of claim 1, wherein the predetermined delay approximates a future time at which a drain-source voltage of the voltage-controlled switch will drop to a minimum.

6. The power converter of claim 1, wherein the current monitor comprises a voltage clamp circuit that sets an upper bound of the voltage across the resistor.

7. The power converter of claim 1, wherein the resistor is associated with a voltage divider.

8. The power converter of claim 1, wherein:
the step-down voltage converter is associated with a first ground loop; and
the output capacitor defines an output voltage node associated with a second ground loop.

9. The power converter of claim 8, wherein the first ground loop is isolated from the second ground loop by a galvanic isolation.

10. The power converter of claim 9, wherein the galvanic isolation comprises an opto-coupler.

11. The power converter of claim 8, wherein the output voltage node is coupled to a snubbing filter.

12. The power converter of claim 1, wherein the power converter is configured to be enclosed within a housing of an electronic device.

13. The power converter of claim 1, wherein the step-down voltage converter is coupled to an output of a full-bridge rectifier that receives alternating current from an alternating current voltage source.

14. The power converter of claim 1, wherein the predetermined delay is approximately one and a half periods of the resonance frequency.

15. A power converter within a housing of an electronic device, the power converter comprising:
a resonant buck converter comprising a tank inductor connected in series with a MOSFET;
a current monitoring circuit magnetically coupled with the tank inductor; and
an on-state controller configured to increase a gate voltage of the MOSFET above a switching threshold of the MOSFET, after a predetermined delay approximately equal to a multiple of a half period of a resonance frequency defined by an inductance of the tank inductor and a capacitance of the on-state controller, when a voltage output from the current monitoring circuit crosses a predetermined threshold.

16. The power converter of claim 15, wherein:
the predetermined delay corresponds to the resonance frequency associated with the tank inductor and the capacitance; and
the capacitance is exhibited by the MOSFET when the MOSFET is in a non-conducting state.

17. The power converter of claim 15, wherein the current monitoring circuit comprises:
an auxiliary inductor magnetically coupled with the tank inductor;
a voltage divider in series with the auxiliary inductor; and
a voltage clamp coupled to the voltage divider and configured to set an upper bound of a voltage output from the voltage divider.

18. A method of reducing voltage in a power converter, the method comprising:
receiving a voltage at an input of a buck converter comprising a tank inductor and a voltage-controlled switch;
monitoring current through an auxiliary inductor isolated from the buck converter;
upon determining that the current through the auxiliary inductor has dropped to zero, initiating a predetermined delay; and
after the predetermined delay, increasing a switching voltage of the voltage-controlled switch; wherein
the predetermined delay is approximately equal to a multiple of a half of one period of a resonance frequency defined by the tank inductor and a capacitance exhibited across the voltage-controlled switch when current through the voltage-controlled switch is zero.

19. The method of claim 18, wherein the predetermined delay is based, at least in part, on a switching frequency of the buck converter.

20. The method of claim 19, wherein the predetermined delay is selected such that the voltage-controlled switch is turned on when instantaneous power consumption of the voltage-controlled switch is at a minimum.

* * * * *